3,113,960
**HEXAHALOCARBONYLBUTYLCARBONYL-
BICYCLOHEPTENES**
Newman M. Bortnick, Oreland, and Marian F. Fegley, Philadelphia, Pa., assignors to Rohm & Haas Company, Philadelphia, Pa., a corporation of Delaware
No Drawing. Filed Oct. 26, 1961, Ser. No. 147,745
2 Claims. (Cl. 260—468)

This invention relates to hexahalocarbonylbutylcarbonylbicycloheptenes as new compositions of matter and to a method for their preparation.

The compounds of the present invention may be represented by the formula

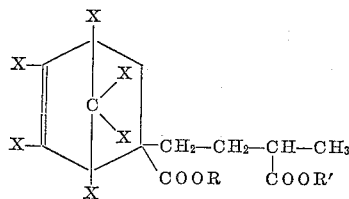

in which X is a halogen atom having an atomic weight of about 35.5 to 80, namely, chlorine or bromine.

The present compounds are preferably prepared by heating a hexahalocyclopentadiene with an α-methylene-α'-methyladipate at a reacting temperature in the range of about 100° to 350° C., and preferably 150° to 275° C. Below 100° C. a reaction occurs but is so sluggish as to be impractical. Appreciably above 350° C. there is a chance of decomposition of the product and, hence, such temperatures are to be avoided.

It is preferred to conduct the present reaction at atmospheric pressures, but, if reaction temperatures are contemplated appreciably above the boiling point of the reaction mixture, pressures greater than atmospheric may be used. Pressures up to about 2000 pounds per square inch are entirely satisfactory. Higher pressures may be employed, if desired, but usually no appreciable benefit is realized from the use of such higher pressures and, therefore, for practical reasons, pressures considerably above 2000 pounds per square inch are not preferred.

The reactants of the present invention are both liquids and, hence, the need for a solvent is obviated. The instant reaction produces yields of up to about 92% without the need of a catalytic impetus. The reactants unite in substantially equimolar proportions to form the products of this invention, although either reactant may be employed in excess in the reaction medium, if desired. The product is preferably isolated by distillation.

The symbol X is preferably chlorine, although bromine is satisfactory. When X is chlorine the hexahalocyclopentadiene reactant is hexachlorocyclopentadiene; when X is bromine, hexabromocyclopentadiene is the reactant.

The hexahalocyclopentadiene reactants employed in the method of this invention may be prepared in any desired manner. For instance, hexachlorocyclopentadiene may be prepared by the addition of 6 moles of cyclopentadiene in 400 ml. of water containing 0.2% of 50% sodium lauryl sulfate to 15 liters of 2 molar sodium hypochlorite which is about 0.5 molar with respect to excess sodium hydroxide. The mixture is stirred briskly during and for two hours after the addition of the reactants. The reaction is mildly exothermic. The reaction mixture is allowed to stand and separate into layers. The hexachlorocyclopentadiene is isolated by distillation from the dried non-aqueous layer. The hexachlorocyclopentadiene distills at 60° to 62° C. at 1.4 mm. pressure.

R and R' represent alkoxyalkyl groups of two to fourteen carbon atoms in which the carbon chains may be straight or branched; aralkyl groups of seven to fourteen carbon atoms in which the alkyl portion may contain a straight or branched carbon chain; and cycloalkyl and alkylcycloalkyl groups of three to fourteen carbon atoms.

Typical embodiments of R and R' include methoxymethyl, methoxyethyl, methoxypropyl, methoxybutyl, methoxyoctyl, methoxydecyl, ethoxymethyl, ethoxyethyl, ethoxypropyl, ethoxyoctyl, propoxyethyl, propoxypentyl, propoxyheptyl, butoxymethyl, butoxyethyl, butoxybutyl, butoxynonyl, butoxydecyl, pentoxymethyl, pentoxybutyl, pentoxypentyl, pentoxyhexyl, pentoxyoctyl, hexoxymethyl, hexoxypropyl, hexoxyhexyl, hexoxyoctyl, heptoxymethyl, heptoxybutyl, heptoxyheptyl, octoxymethyl, octoxyethyl, octoxybutyl, octoxyhexyl, benzyl, phenylethyl, phenylbutyl, phenylhexyl, phenyloctyl, naphthylmethyl, naphthylethyl, naphthylpropyl, naphthylbutyl, cyclopropyl, cyclobutyl, cyclopentyl, cyclohexyl, butylcyclopentyl, octylcyclohexyl, cyclopentylheptyl, and cyclohexyloctyl.

The α-methylene-α-methyladipate reactants may be represented by the formula

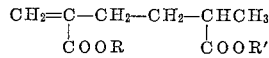

in which R and R' have the significance previously set forth. These reactants are known or may be prepared by known methods. For instance they may be obtained by reacting α-methylene-α'-methyladipic acid or the corresponding acid chloride with the desired alcohol under esterifying conditions.

If R and R' are to represent identical groups in the product, it is generally somewhat preferable to form the product by reacting the desired RR' etser of α-methylene-α'-methyladipic acid with the selected hexahalocyclopentadiene. If R and R' are to represent different groups and the desired product would contain an R' that could be supplied by an R'OH compound having a boiling point of about 150° C. or more, the transesterification modification is somewhat preferable, using an adipate reactant in which R' is a methyl group. The ester group to be transesterified, if only one is to be so treated, must necessarily be at the R' position since the reactivities of the ester groups are apparently such that the R' group is completely replaced before the R group reacts. The transesterification is conducted after the hexahalocyclopentadiene addition has been completed. It is possible, if desired, to form products of this invention by transesterification, preferably of the dimethyl ester, involving both ester groups, but such is not preferred.

If it is desired to obtain esters of this invention by transesterification, instead of by direct addition of the selected hexahalocyclopentadiene to the desired ester of α-methylene-α'-methyladipic acid, the dimethyl ester of α' methylene-α'-methyladipic acid is first reacted with the selected hexahalocyclopentadiene. The transesterification is conducted in the presence of preferably a strongly acidic esterifying catalyst including sulfuric acid, a lower alkanesulfonic acid such as butanesulfonic acid, or an arylsulfonic acid such as p-toluenesulfonic acid, and the like or a strongly alkaline esterifying catalyst such as sodium methoxide. It is, also, possible to employ a strongly acidic ion exchange resin such as a sulfonated polystyrene or sulfonated phenol-formaldehyde resin.

The transesterification is preferably conducted at the reflux temperature of the reaction mixture, which is usually in the range of about 100° to 275° C., preferably about 150° to 225° C. The pressure is adjusted, when necessary, to conform to the above temperatures. Also, if desired, small amounts of a volatile inert organic solvent, such as toluene, xylene, or the like, may be used to help regulate the reflux temperature. Methyl alcohol is distilled off as the transesterification progresses and the reaction is continued until the theoretical amount of methyl alcohol is collected. In this way it is possible to transesterify either one or both of the ester groups concerned, as desired. Transesterification may be conducted, as stated previously, in the presence of either an acid or alkaline catalyst. An alkaline catalyst is preferred if both groups are to be transesterified.

At the conclusion of the transesterification, the product is isolated, such as by neutralizing the catalyst, filtering, and distilling, preferably under reduced pressure.

The products of this invention are valuble pesticides being particularly useful in the control of the common housefly as rapid knockdown agents. In percentages as low as 1.0–2.0% by weight the present products exhibited marked potency when applied in a common oil-base spray carrier. The instant compounds may be used in aqueous emulsions, aerosols, dusts, or oil sprays. There may be incorporated other desired pesticides, as desired, by known methods. The subject compounds are valuable plasticizers particularly for polyvinyl chloride. For example, a mixture of 40 parts of a present product, 60 parts of polyvinyl chloride, 1 part of tribasic lead sulfate, and 0.5 part of stearic acid milled for seven minutes at 325° F. gave a flexible film that was markedly fire resistant. The present products react with polyhydric alcohols, such as diethylene glycol and glycerin, to form alkyd resins having superior fire-retardant properties. These condensates may be modified with fatty glycerides, including drying oils, with retention of appreciable fire-retardant properties.

The compounds and the method for their preparation of the present invention may be more fully understood from the following examples which are offered by way of illustration but not by way of limitation. Parts by weight are used throughout.

*Example 1*

There are added together in a reaction vessel, equipped with a stirrer and a thermometer, 400 parts of hexachlorocyclopentadiene and 289 parts of dimethyl α-methylene-α'-methyladipate. The mixture is heated for 23 hours at 163° to 165° C. The product is isolated by distillation at 200° C. at 1.5 mm. pressure. The product contained 44.67% chlorine (44.97% theoretical) and gave a value $n_D^{25}$ of 1.5236. The product may be named 1,2,3,4,7,7-hexacloro - 5 - methoxycarbonyl - 5(3 - methoxycarbonylbutyl)-bicyclo-(2.2.1)-hept-2-ene.

Similarly, the corresponding hexabromocyclopentadiene product with dimethyl α-methylene-α'-methyladipate is prepared by employing hexabromocyclopentadiene instead of the hexachlorocyclopentadiene.

*Example 2*

There are reacted at 175° to 178° C. for 20 hours 349 parts of methyl butyl α-methylene-α'-methyladipate and 400 parts of hexachlorocyclopentadiene. The product is isolated by distillation at 186°–190° C. at 0.1 mm. pressure. The product contained 40.7% chlorine (41.3% theoretical) and gave a value $n_D^{25}$ of 1.5120. The product may be named 1,2,3,4,7,7-hexachloro-5-methoxycarbonyl-5(3-butoxycarbonylbutyl)-bicyclo(2.2.1)-2-heptene. It might also be named butyl 4-[5-(5-methoxycarbonyl-1,2,3,4,7,7-hexachloro) - bicyclo[2.2.1] - 2 - heptene] - 2 - methylbutanoate.

There is prepared in like manner the product of hexachlorocyclopentadiene and tetradecyl propyl α-methylene-α'-methyladipate which may be named 1,2,3,4,7,7-hexachloro - 5 - tetradecoxycarbonyl - 5)3 - propoxycarbonylbutyl)bicyclo 2.2.1)-2-heptene.

*Example 3*

There are introduced into a reaction vessel 400 parts of hexachlorocyclopentadiene and 430 parts of methyl 2-ethylhexyl α-methylene-α'-methyladipate. The reaction mixture is heated at 195°–202° C. for 22 hours after which time the product was isolated by distillation. The product had a chlorine content of 36.4% (37.3% theoretical) and may be represented by the formula

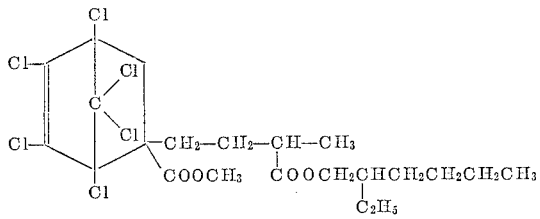

There is similarly prepared from hexachlorocyclopentadiene and dicyclohexyl α-methylene-α'-methyladipate the product having the formula

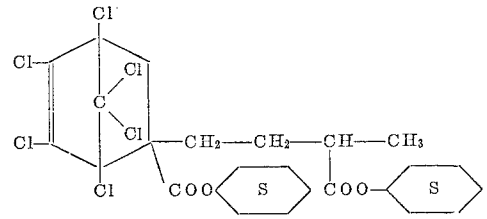

*Example 4*

There are reacted at 205°–208° C. for 16 hours 400 parts of hexachlorocyclopentadiene and 409 parts of dibutyl α-methylene-α'-methyladipate. The product is isolated by distillation at 184°–190° C. at 0.2 mm. The product had a chlorine content of 38.8% (38.2% theoretical) and gave a $n_D^{25}$ value of 1.5089. The product may be named 1,2,3,4,7,7-hexachloro-5-butoxycarbonyl-5(3-butoxycarbonylbutyl)-bicyclo(2.2.1)-hept-2-ene.

There is likewise prepared the product of hexachlorocyclopentadiene and ethyl naphthylbutyl-α-methylene-α'-methyladipate which may be named 1,2,3,4,7,7-hexachloro-5-ethoxycarbonyl-5(3 - naphthylbutoxycarbonylbutyl)-bicyclo(2.2.1)-2-heptene.

*Example 5*

There are added to a reaction vessel 400 parts of hexachloro-cyclopentadiene and 670 parts of dioctoxyhexyl α-methylene-α'-methyladipate. The reaction mixture is heated at 210°–216° C. for 11 hours. The product was isolated by distillation. The product may be named 1,2,3,4,7,7-hexachloro - 5 - octoxyhexyloxycarbonyl-5(3-octoxyhexoxycarbonylbutyl)-bicyclo (2.2.1)-2-heptene.

The same product is obtained by transesterification, employing dimethyl α-methylene-α'-methyladipate and octoxyhexyl alcohol. The transesterification is conducted at the reflux temperature in the presence of sulfuric acid and toluene until two equivalents of methyl alcohol are distilled off and collected. Other catalysts that may be employed with similar results are an alkanesulfonic acid such as butanesulfonic acid, an arylsulfonic acid such as p-toluenesulfonic acid, and an acidic ion exchange resin, such as sulfonated polystyrene.

*Example 6*

There are reacted 400 parts of hexachlorocyclopentadiene and 628 parts of pentyl octylcyclohexyl α-methylene-α'-methyladipate at 222°–226° C. for six hours. The product was isolated by distillation and may be named, 1,2,3,4,7,7 - hexachloro-5-pentoxycarbonyl-5(3-octylcyclohexoxycarbonylbutyl)-bicyclo(2.2.1)-2-heptene.

Similarly, there is prepared the product of hexabromocyclopentadiene and butoxyethyl cyclopentyl α-methylene-α'-methyladipate which may be named 1,2,3,4,7,7-hexabromo - 5 - butoxyethoxycarbonyl-5(3-cyclopentoxycarbonylbutyl)-bicyclo(2.2.1.)-2-heptene.

*Example 7*

There are added to a reaction vessel 400 parts of hexachlorocyclopentadiene and 530 parts hexyl ethyl α-methylene-α′-methyladipate. The reaction mixture was heated at 200°–205° C. for seven hours. The product was isolated by distillation and identified as 1,2,3,4,7,7-hexachloro-5-hexoxycarbonyl-5(3-ethoxycarbonylbutyl) - bicyclo-(2.2.1)-hept-2-ene. There are then added to a reaction vessel 100 parts of the above product, 100 parts of benzyl alcohol, and 1 part of sodium methoxide. The mixture is refluxed at 80 mm. pressure while volatile components are continuously removed. The reaction is discontinued after one equivalent of ethanol is collected in the receiver. The reaction mixture is treated with sulfuric acid, filtered, and distilled under reduced pressure. The product is identified as 1,2,3,4,7,7-hexachloro-5-hexoxycarbonyl-5(3-benzyloxycarbonyl-butyl)-bicyclo-(2.2.1)-hept-2-ene. By continuing the above reaction until an equivalent of hexyl alcohol is also collected in the received there is obtained the compound corresponding to 1,2,3,4,7,7-hexochloro-5-benzyloxy-carbonyl-5(3-benzyloxycarbonylbutyl) - bicyclo-(2.2.1)-hept-2-ene.

*Example 8*

There are added to a reaction vessel 48 parts of the product of Example 1, which is 1,2,3,4,7,7-hexachloro-5-methoxycarbonyl - 5(3 - methoxycarbonylbutyl)-bicyclo-(2.2.1)-2-heptene, and 30 parts of n-butanol in which 0.2 part of sodium had been dissolved. The reaction mixture is heated at reflux and the evolved methanol is collected until 4.1 parts are accumulated. During the period of reflux 10 parts of n-butanol having 0.8 part of sodium dissolved therein are introduced into the reaction mixture. The reaction mixture is allowed to cool and is washed, first, with 50 parts of aqueous 20% acetic acid and then with 50 parts of water. The wash solutions are extracted with ether and the ether layers are combined. Volatile components are stripped from the combined ether layers leaving the product as the residue. The product contains 37.2% chlorine (38.2% theoretical), gives an $n_D^{25}$ value of 1.5089, has a molecular weight of 550±9 (557.18 theoretical), and distills at 201° to 214° C. at 0.6 mm. of pressure. The product corresponds to 1,2,3,4,7,7-hexachloro-5-butoxycarbonyl-5(3-butoxycarbonylbutyl) - bicyclo-(2.2.1)-2-heptene.

*Example 9*

There are added to a reaction vessel 30 parts of n-butanol, 48 parts of 1,2,3,4,7,7-hexachloro-5-methoxycarbonyl - 5(3 - methoxycarbonylbutyl)bicyclo(2.2.1) - 2-heptene, and 0.5 part of sulfuric acid. The reaction mixture is heated at reflux and methanol is evolved. At the end of twelve hours 2.6 additional parts of sulfuric acid is added to the reaction mixture and refluxing is continued for seven additional hours. The evolved methanol is collected. The collected methanol totals 3.8 parts. The reaction mixture is allowed to cool. The mixture is washed with water and then distilled. The product distills at 186° to 190° C. at 0.1 mm. of pressure, has a molecular weight of 517±17 (515.1 theoretical), gives an $n_D^{25}$ value of 1.5120, and has a chlorine content of 40.7% (41.3% theoretical). The product corresponds to 1,2,3,4,7,7-hexachloro-5-methoxycarbonyl-5(3-butoxycarbonylbutyl)-bicyclo(2.2.1)-2-heptene.

Similarly using phenylbutanol there is prepared the corresponding diphenylbutyl ester.

*Example 10*

Into a reaction vessel there are added 260 parts of 2-ethylhexanol and 240 parts of 1,2,3,4,7,7-hexachloro-5-methoxycarbonyl - 5(3 - methoxycarbonylbutyl) - bicyclo (2.2.1)-2-heptene. Traces of water in the 2-ethylhexanol are removed azeotropically at slightly reduced pressure. The reaction mixture is cooled and 1 part of sulfuric acid is added. The mixture is heated at a pot temperature of 140° C. under a slight vacuum until 16.3 parts of methanol is collected. An additional 1 part of sulfuric acid is introduced after 11.7 parts of methanol are collected. The reaction mixture is washed twice with 100 parts of water and then stripped to a final pot temperature of 150° C. at 1 mm. of pressure, leaving the product as the residue. The product has 37.3% chlorine (36.4% theoretical) and corresponds to 1,2,3,4,7,7-hexachloro-5-methoxycarbonyl-5[3 - (2 - ethylhexoxycarbonyl)butyl]-bicyclo(2.2.1)-2-heptene.

We claim:
1. The compound

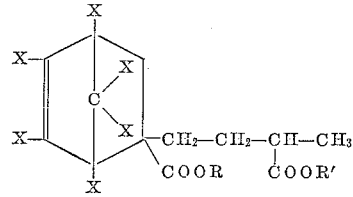

in which X is a halogen atom having an atomic weight of about 35.5 to 80 and R and R′ are members selected from the class consisting of alkoxyalkyl of two to fourteen carbon atoms, phenylalkyl, naphthylalkyl and cycloalkyl and alkylcycloalkyl of three to fourteen carbon atoms.

2. 1,2,3,4,7,7-hexachloro - 5 - benzyloxycarbonyl - 5(3-benzyloxycarbonylbutyl) - bicyclo(2.2.1) - hept - 2-ene.

References Cited in the file of this patent
UNITED STATES PATENTS 2,752,361   Robitschek et al. _____ June 26, 1956